Figure 1:
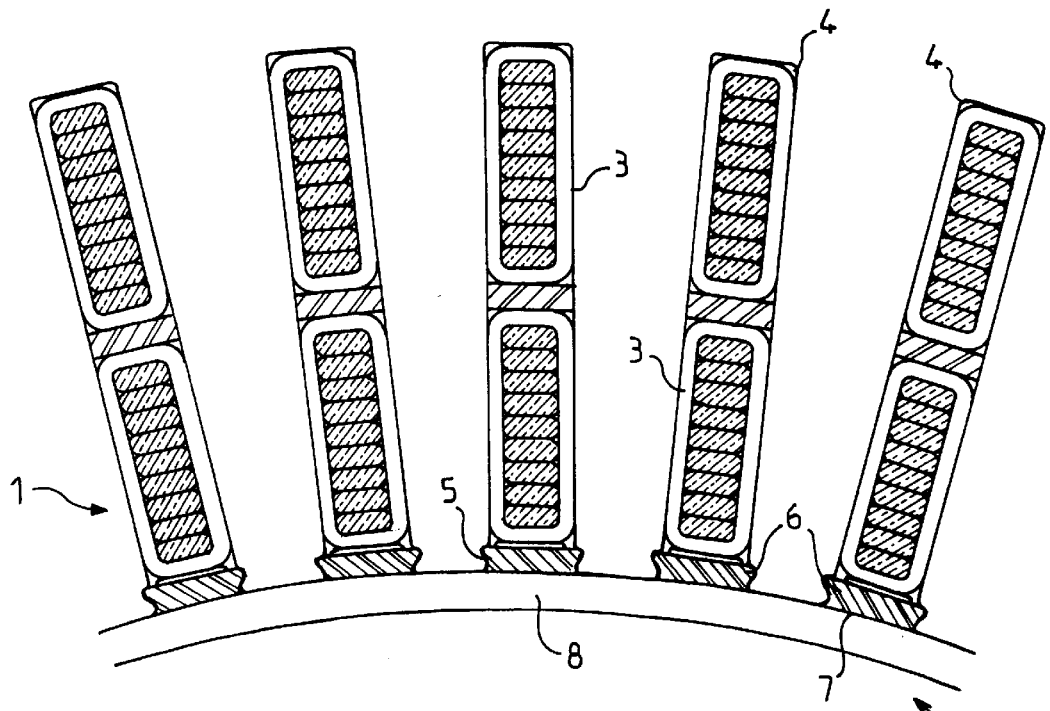

United States Patent [19]
Pommelet

[11] Patent Number: 5,854,525
[45] Date of Patent: Dec. 29, 1998

[54] JACKETED ROTARY MACHINE

[75] Inventor: Hervé Pommelet, Elesmes, France

[73] Assignee: Jeumont Industrie, Courbevoie, France

[21] Appl. No.: 690,727

[22] Filed: Jul. 31, 1996

Related U.S. Application Data

[63] Continuation-in-part of Ser. No. 281,403, Jul. 27, 1994, abandoned.

[30] Foreign Application Priority Data

Jul. 30, 1993 [FR] France ................................. 93 09455

[51] Int. Cl.$^6$ ....................................................... H02K 3/48
[52] U.S. Cl. ............................... 310/214; 310/52; 310/87; 310/89; 310/215
[58] Field of Search ................................ 310/52, 87, 214, 310/215, 89

[56] References Cited

U.S. PATENT DOCUMENTS

| | | | |
|---|---|---|---|
| 3,594,597 | 7/1971 | Kildishev et al. | 310/214 |
| 3,976,901 | 8/1976 | Liptak et al. | 310/214 |
| 4,469,971 | 9/1984 | Moore | 310/214 |
| 4,633,574 | 1/1987 | Bath et al. | 29/596 |
| 4,645,421 | 2/1987 | Huether | 416/92 |
| 4,876,469 | 10/1989 | Khutoretsky et al. | 310/52 |
| 5,015,159 | 5/1991 | Mine et al. | 417/366 |
| 5,053,663 | 10/1991 | Boer et al. | 310/91 |
| 5,124,607 | 6/1992 | Rieber et al. | 310/214 |

Primary Examiner—Thomas M. Dougherty
Assistant Examiner—Elvin G. Enad
Attorney, Agent, or Firm—Frommer Lawrence & Haug LLP; William S. Frommer

[57] ABSTRACT

A rotary machine having a stator with a stator bore designed for accommodating a jacket. The stator comprises coils retained in notches and notch closing shims, wherein elastic members are provided between the coils and the shims. The shims protrude from the bore and the jacket is retained elastically in the bore by the pressure exerted on the jacket by the shims.

8 Claims, 5 Drawing Sheets

JACKETED ROTARY MACHINE

This application is a continuation-in-part of application Ser. No. 08/281,403, filed Jul. 27, 1994 now abandoned.

This invention relates to rotary machines and more especially, those which exhibit a jacket in their stator bore.

Indeed, it is well-known that in all types of synchronous and asynchronous machines, service or environment conditions may require the stator to be jacketed. This is the case for engines operating in a severe environment, in chemical or polluted media, in immersed media as well as in all cases where the coil must be insulated or protected from the fluid in the airgap.

Jacketing the stator of an alternate current machine can be performed using a metal material, such as an amagnetic steel. However, such a metal part generates losses caused by eddy currents, which reduces the machine output.

This solution is only acceptable if the frequency is not too high (less than 50 Hz) and the cooling of the jacket easy. But the loss of output becomes objectionable for machines operating at higher frequencies.

Therefore, in numerous cases, one should consider the jacketing of the stator with an amagnetic and non-conducting material in order to avoid losses caused by eddy currents. Materials used conventionally are composites and ceramics.

In order not to influence the sizing of the machines excessively and especially not to increase their diameters too much, the thickness of the jackets foreseen in the stator bore must be low. The jackets must be supported by the sheets of the stator bore in order to resist deformations and they are shrunk inside the bore directly.

It has been noticed that conventional assemblies, with the jacket shrunk inside the stator bore, do not raise any particular problems when the jacket is made of a metal material, taking into account the similarity between the dilatation coefficients of the stator sheets and of the jacket.

These assemblies, however, exhibit shortcomings when the jacket is made of a non-conducting material.

Indeed, the materials in the machine exhibit various dilatation coefficients. Thus, under the influence of the machine warming up or of the environment, the jacket is either free inside the bore, which generates vibrations and implies rapid degradation, or compressed exaggeratedly, which leads to its fracture.

These operating defects require parts to be replaced frequently and causes long non-productive times for the equipment.

The purpose of the invention is to remedy the shortcomings exhibited by the rotary machines fitted with parts whose thermal dilatation coefficients are different, without any risks and without diminishing the machine performances, while offering a new system for installing a jacket in a rotary machine stator bore.

The invention is especially suited for machines comprising a non-metallic jacket, but it can also fit machines whose jacket is made of a metallic material.

Therefore, the invention relates to a rotary machine comprising a stator with coils retained in notches by shims and a leakproof jacket located in the stator bore wherein the shims for retaining the coils are fixed in the notch, a passage being arranged between said retaining shims and the notch end leading in the bore and wherein the machine comprises also notch closing shims protruding from said bore to avoid direct contact between the jacket and the bore, and elastic means between said shims for retaining the coils and said notch closing shims, said latter exerting a pressure on the jacket and while giving an elastic support for the jacket, in order to compensate for any possible dilatation deviations.

Thanks to this elastic assembly, the jacket is never in contact with the surface of the stator bore and any possible dilatation deviations are compensated for which may occur in normal operating conditions. The jacket does not undergo any more excessive stresses during the operation of the machine.

Thus, the clearance between the jacket and the stator bore (i.e., the residual clearance which remains once the jacket has been mounted), is chosen in such a way that the jacket does not engage the bore, in all the working stages of the machine.

In said embodiment, the notch closing shims are moveable into the notch according to the axis thereof, their movement towards the notch inner part being limited by a stop.

Preferably, the elastic means are distributed essentially uniformly on the whole height of the shims in order that the shims provide an essentially uniform pressure stress.

Advantageously, the machine comprises intermediary shims, the elastic means of each notch being provided between an intermediary shim and a notch closing shim, said intermediary shim abutting, against the shim for retaining the coils.

The elastic means, for example, may be made of ripple springs or springs.

The rotary machine according to the invention comprises, for instance, a jacket made of an amagnetic and non-conducting material such as a composite or a ceramic material.

Figure 3:
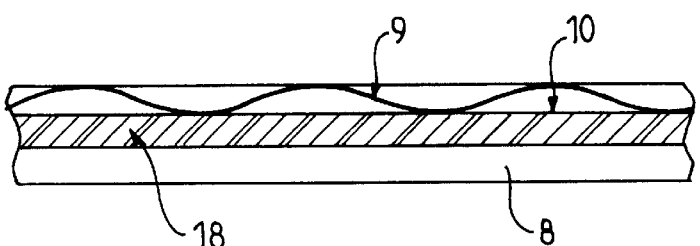
Figure 2:
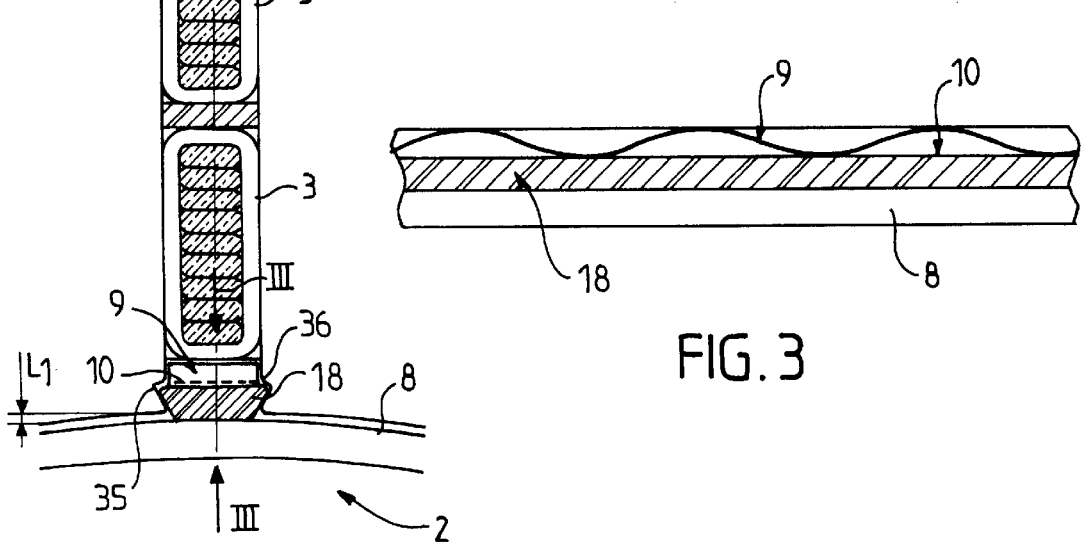
Figure 4:
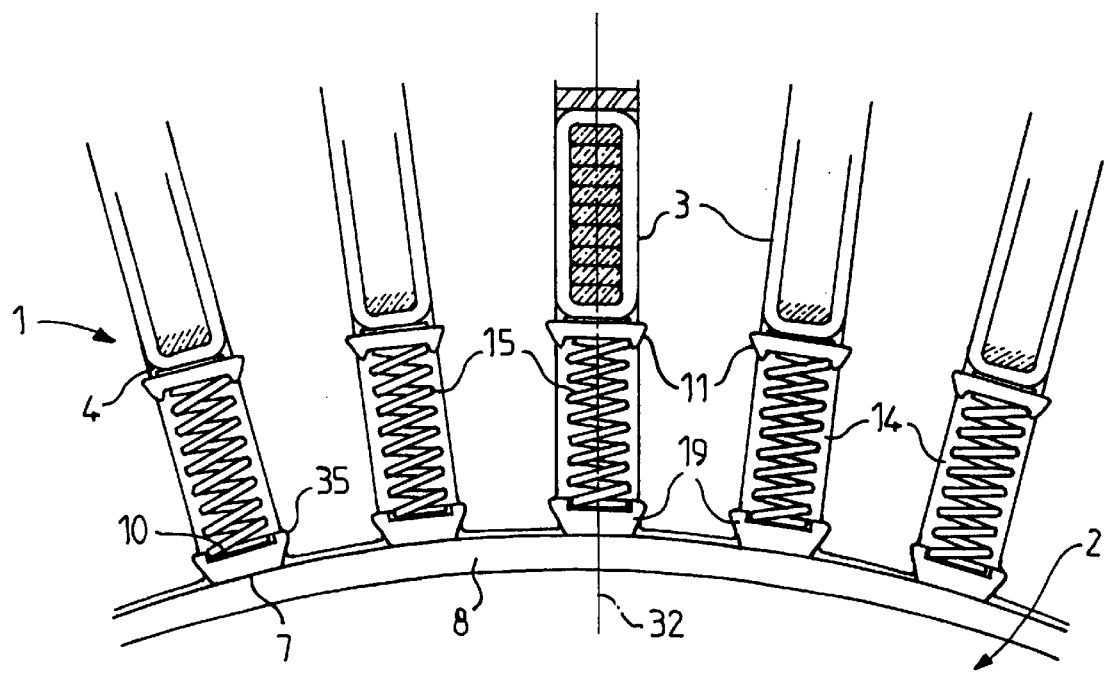
Figure 5A:
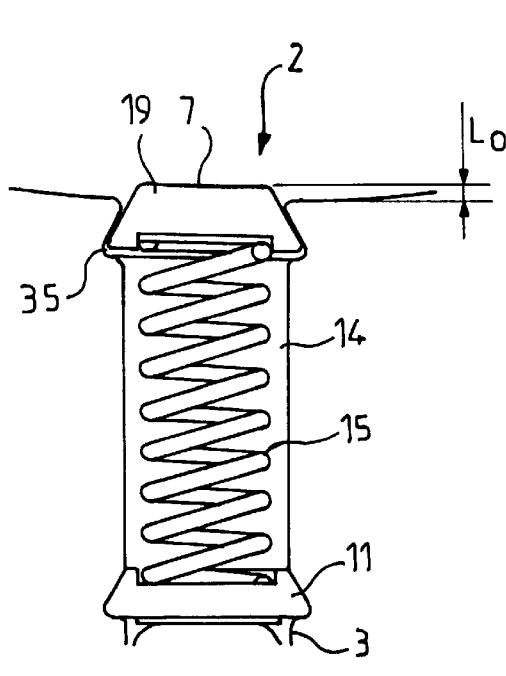
Figure 5B:
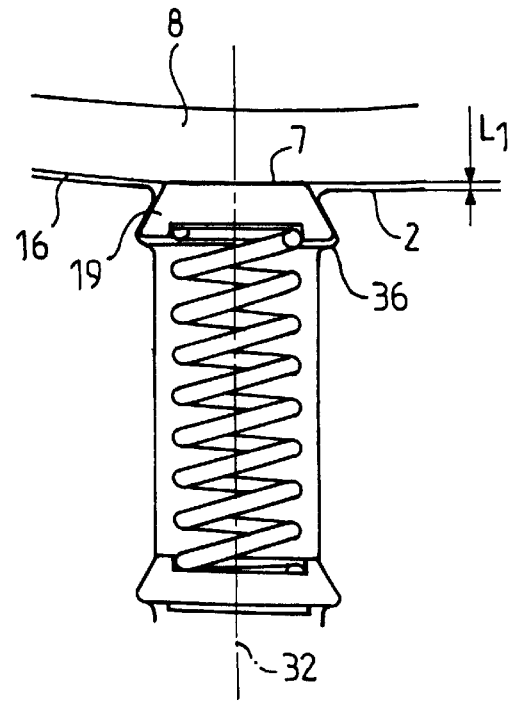
Figure 6A:
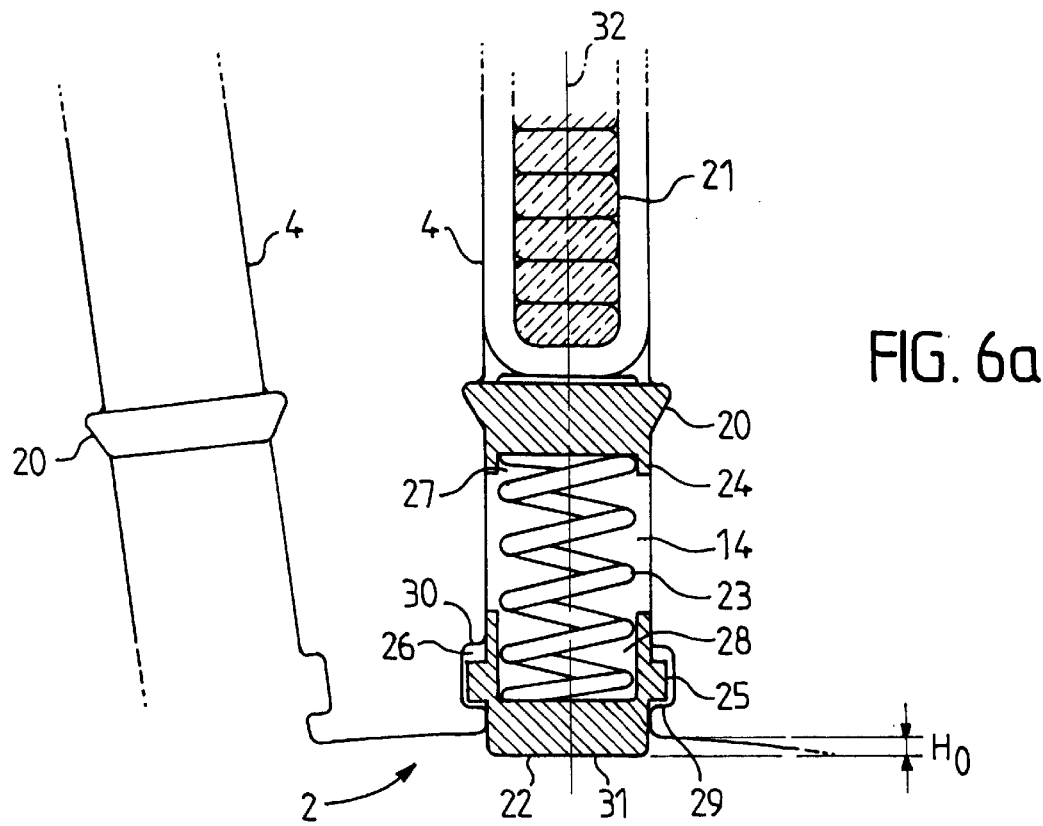
Figure 6B:
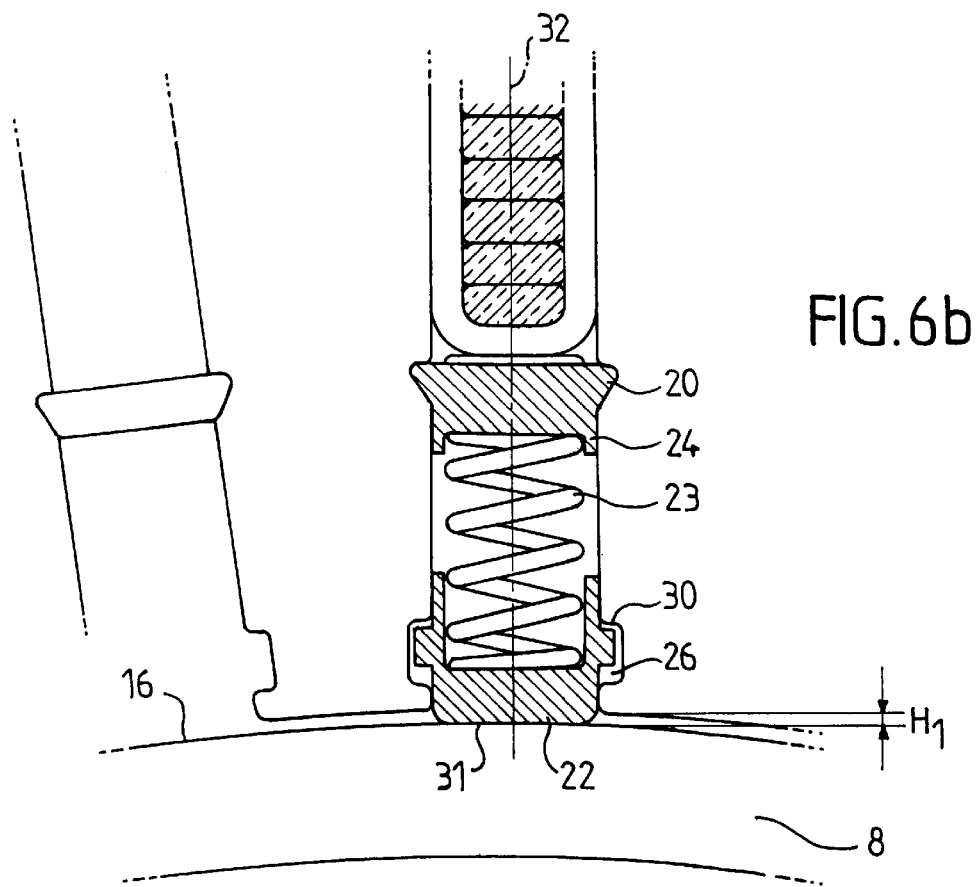

The invention will be understood better and other scopes, advantages and features of the said, will become clearer when reading the following description, with reference to the appended drawings on which:

FIG. 1 is a partial section of a rotary machine according to the prior art perpendicular to the machine axis, FIG. 2 is a partial section of a first embodiment of a rotary machine according to the invention, perpendicular to the machine axis, FIG. 3 is a partial cross section according to III—III of FIG. 2, FIG. 4 is a partial section of a second embodiment of a rotary machine according to the invention, perpendicular to the machine axis, FIG. 5 comprises FIGS. 5a and 5b which illustrate in detail the position of the notch shim, before and after installing the jacket in the stator bore, for the machine according to FIG. 4 and FIG. 6 comprises FIGS. 6a and 6b which are partial sections, according to a perpendicular plane to the machine axis, of a third embodiment of the rotary machine; FIG. 6a showing the machine before installing the jacket in the stator bore and FIG. 6b showing the machine after installing.

Figure 7:
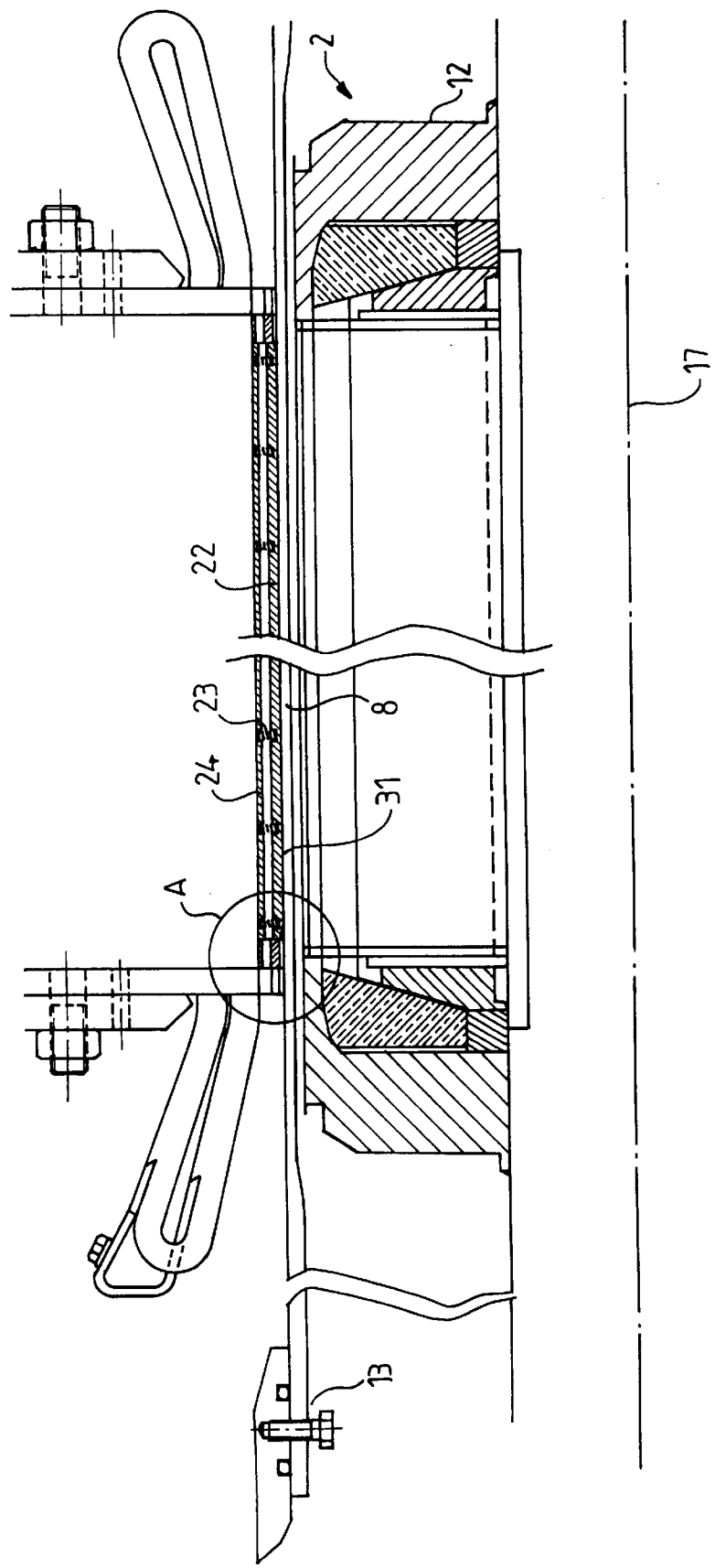
Figure 8:
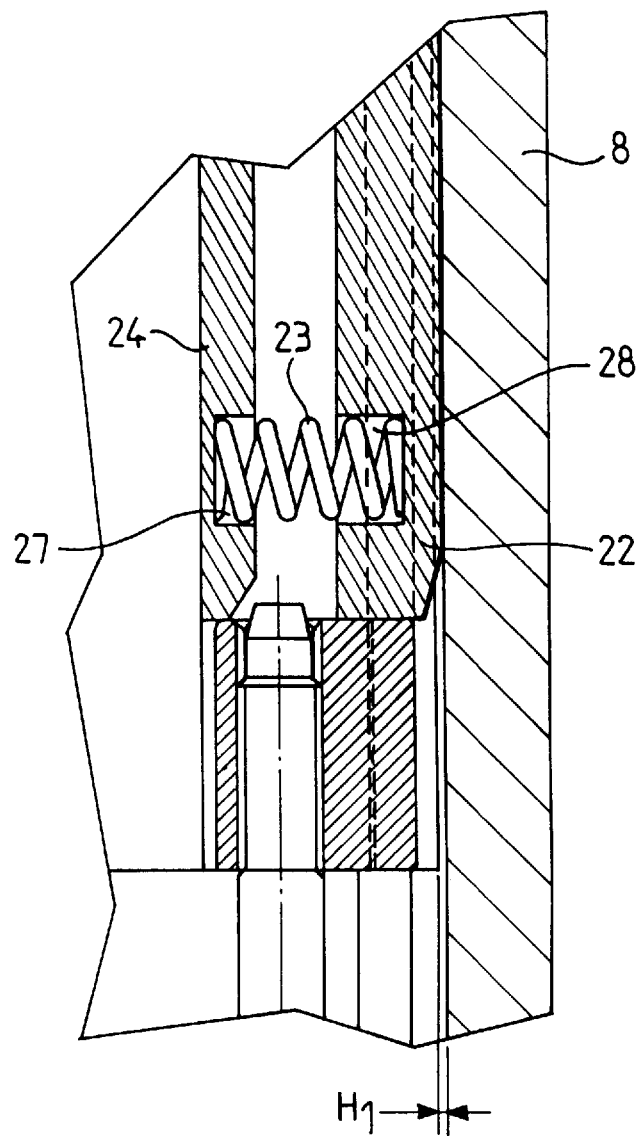

FIG. 7 shows an axial semi-section of a rotary machine according to FIG. 6 and FIG. 8 is an enlarged view of detail A of FIG. 7.

The elements which are common to the various Figures will be indicated by the same references.

With reference to FIG. 1, a conventional rotary machine comprises a stator 1, whose bore 2 is designed to accommodate the rotor of the machine which has not been shown on the Figure. The magnetic circuit foreseen in the stator is made of coils 3 located in notches 4. At the end of the notches 4, beside the bore 2, dovetail recesses 5 have been designed, to accommodate shims 6.

These shims 6 are commonly called << notch closing shims >>. In conventional machines, they enable to retain the coils in the notches 4. The outer surface 7 of the shims is arranged with minimum offset with respect to the surface of the stator bore 2. Indeed, it is necessary that the jacket bears both on the bore sheets as well as on the shims in order not to become distorted at the level of each notch.

A metal jacket is shrunk in the bore. Thus, the jacket 8 bears on the bore sheets.

Now, with reference to FIG. 2, it can be noted that in the rotary machine according to the invention, the jacket is not centered rigidly in the stator sheets, but is maintained elastically in the stator bore, thanks to a floating assembly.

This elastic centering is performed using the notch closing shims 18 which are applied against the jacket 8 while exerting a certain pressure against the jacket, thanks to the presence of elastic means 9.

It should be noted that the dovetail recesses 35 have been modified with regard to those arranged on a conventional machine, such as illustrated on FIG. 1. This will appear more clearly with FIGS. 5a and 5b. Said modifications take into account the height of the shims 18 which is greater than that of the shims provided on a conventional machine.

Moreover, said modifications allow the moving of the shims 18 into the recesses 35 according to the axis 32 of the notch, while in a conventional machine the shims are fixed into the dovetail recesses 5.

The movement of the shims 18 towards the notch inner part is limited by the bottom 36 or inner side of the recess 35 providing a stop.

The elastic means 9 are arranged preferably before assembling the jacket in the stator bore, bearing between the coils 3 on the one hand and the inner surface 10 of the shims 18 on the other hand. These elastic means 9 comprise elastic strips arranged into a tape, commonly called << ripple springs, >>. They are distributed over the whole inner surface 10 of the shims, as can be seen more accurately on FIG. 3.

The FIG. 4 illustrates a second embodiment of a rotary machine according to the invention.

Two series of shims are located in the notches 4. It is the shims bearing the reference 11 which provide retaining the coils 3 in the notches 4. The shims 11 are fixed into the notches.

A passage 14 is arranged between each shim 11 and the notch end leading in the bore 2.

Elastic means 15 are provided between the shims 11 and the notch closing shims 19. The elastic means 15 and the shims 19 provide a floating assembly of the jacket 8 into the bore 2. The shims 19 provide the continuity of the bore to avoid deformation or impairing of the jacket 8 with regard of each notch. The shims 19 are located into recesses 35, similar to those shown in FIG. 2.

The elastic means 15, here, are made of springs. They can be made differently, for example, from elastic strips as shown in FIGS. 2 and 3.

We are now going to describe more in detail, using the FIGS. 5a and 5b, the role and the operation of the elastic means 15 and of the shims 19, in the rotary machine according to the invention.

The FIG. 5a illustrates the relative position of a shim 19, of the elastic means 15 and of the stator bore 2, before assembling the jacket.

The precompressed springs 15 maintain the shim 19 against the dovetail recess 35. The height of the shim 19 has been selected so that it protrudes partially with respect to the bore 2. Thus, the portion of the shim 19 which protrudes into the bore, exhibits a height $L_0$, calculated with respect of the pressure that one wants to apply on the jacket, once mounted.

Let us now turn to the FIG. 5b which illustrates the respective position of the parts, once the jacket 8 has been installed. When inserting the jacket 8 into the bore 2, the shim 19 penetrates slightly into the notch 4 according to the axis 32 thereof and presses against the outer surface 16 of the jacket. Thus, the shims 19 exert a pressure which is distributed over the whole outer the surface of the jacket 8.

The movement of the shim 19 towards the notch inner part is limited by the bottom 36 of the recess 35 making a stop.

Once the jacket has been mounted, there is a residual clearance between the outer surface 7 of the shim and the bore 2, referred to as L1. This residual clearance L1, between the jacket and the bore, must be determined in relation to the foreseen dilatation deviations which depend on the operating conditions, so that the jacket must never engage the bore directly, during the operation of the rotary machine. Moreover, the jacket is never free into the bore since it is elastically retained in said latter.

Thus, thanks to this elastic assembly, the possible differences between the radial dilatations of the various parts of the machine, especially the sheets of the stator bore and the jacket, are compensated for. This assembly is particularly interesting for jackets made of a non-metal material, but it can also be used for metal jackets.

FIGS. 6a and 6b show a third embodiment of a rotary machine according to this invention.

As in the embodiment shown in FIG. 4, two series of shims are provided in the notches. The shims designated 20 provide the retaining of coils 21 in the notches 4. The shims 20 are fixed into the notches.

A passage 14 is thus provided between the shims 20 and the end of the notch leading into the bore.

The notch closing shims are designated 22.

Said shims 22 and the elastic means 23 allow to obtain an elastic assembly of the jacket into the stator bore. The elastic means 23 are made herein by springs. They would also be made with others configurations, for example, elastic strips arranged into a tape. With such an assembly and notwithstanding possible differential radial dilatations, the jacket is not subject to deformation or impairing particularly at the level of each notch.

The elastic means 23, in the example shown, are retained between a notch closing shim 22 and an intermediary shim 24. Said intermediary shim 24 is not absolutely necessary but it allows to make the assembly of the elastic means and the notch closing shim before the introduction thereof into a notch 4 of the machine, according to the axis of said latter.

Said previous assembly simplifies the making of the machine. Indeed, the elastic means are relatively difficult to handle. It is not easy to introduce them into the notches, particularly with machines the bore of which has a low diameter.

After the introduction into the notch 4, the intermediary shim 24 is abutting onto the shim 20 which allows the retaining of the coils into the notch.

The shims 22 and 24 as well as the elastic means 23 are also shown in FIGS. 7 and 8.

FIG. 7 shows schematically the whole assembly.

The elastic means 23 are distributed over the whole height of the shims 22 and 24. The pressure exerted on the shims 22 is thus essentially uniformly distributed. All the shims 22 can then exert a pressure which is also essentially uniformly distributed over the whole outer surface 16 of the jacket 8.

The reference 12 is the rotor, centered on the axis 17 of the machine.

The FIG. 7 shows that the outer surface 31 of the shim 22 engages the jacket 8. The shim protrudes moreover, with respect to the surface of the bore 2, which prevents any direct contact of the jacket 8 with the surface of the bore.

Finally, the jacket 8 is linked to the machine using conventional means, shown partially on FIG. 7, under reference 13.

In a plane perpendicular to the axis of the machine, the shims 22 have an essentially rectangular section with protruding parts 25 parallel to the axis 17 of the machine and provided to be inserted into recesses 26 arranged in the notch 4.

The shims 24 have also an essentially rectangular section, in a perpendicular plane to the axis of the machine.

The elastic means are, at a end, inserted into a recess 27 provided in the shim 24 and at the other end into a recess 28 provided in the shim 22.

FIG. 6a shows the relative positions of the notch closing shim 22, of the elastic means 23 and of the stator bore 2 before the assembly of the jacket.

The elastic means 23 are precompressed and maintain the shim 22 against the outer side 29 of the recess 26 provided in the notch 4. The height of the part of the shim 22 located between the protruding part 25 and the outer side of the shim 22 is selected so that the shim 22 protrudes partially with respect to the stator bore 2. $H_0$ is the height of the shim 22 which is beyond the bore between the outer side 31 of the shim and the bore.

FIG. 6b shows the respective position of the parts after the assembly of the jacket 8 in the stator bore. Because of the insertion of the jacket into the bore, the shim 22 penetrates slightly and the protruding part 25 draws nearer to the inner side 30 of recess 26. The shim 22 exert thus a pressure on the outer surface 16 of the jacket.

All the shims 22 exert thus a pressure which is essentially uniformly distributed on the whole outer surface of the jacket 8, the elastic means being essentially uniformly distributed as shown in FIG. 7.

After the assembly of the jacket, there is a residual clearance between the outer surface 31 of the shim 22 and the bore 2, designated by $H_1$.

Thus the shim 22 is able to move into the notch 4 according to the axis 32 of said latter. The movement thereof towards the inner of the notch 4 is limited by the inner side 30 of the recess 26 making a stop, while the movement thereof towards the outer of the notch 4 is also limited by the outer side 29 making a stop.

The height $H_0$ and the clearance $H_1$ are previously determinated according to the foreseen dilatation differences and are linked to the operating conditions of the machine, in such a way that the jacket is never in direct contact with the bore during the operating conditions of the rotary machine. Moreover, the jacket would not be never free in the bore since it is elastically retained in said latter.

FIG. 8 shows also the machine according to this invention after the assembly of the jacket 8 in a parallel section to the axis of the machine.

The recesses 27 and 28 provided respectively in the shim 24 and in the shim 22 are adapted to the configuration of the elastic means 23. They are herein cylindrical, essentially symmetrical with respect to the axis 32 of the notch.

The shim 24 is abutting onto the shims 20 which provide the retaining of the coils into the notch and which are fixed. The shim 22 is slightly inserted into the notch during the assembly and FIG. 8 shows the residual clearance $H_1$ between the outer side 31 of the shim 22 and the bore 2.

One can note that the pressure stress exerted on the notch closing shims may be obtained by any elastic means liable to sustain the operating conditions of a rotary machine and compatible with usage in such a machine.

Such elastic means can, for instance, be made of elastic strips arranged into a tape called << ripple springs >>.

Thus in all cases, the rotary machine according to the invention, comprising a floating assembly of a jacket made of an amagnetic and non-conducting material, can be performed without any significative modifications of the machine structure. This is the reason why the rotary machine according to the invention provides a simple solution to the problems raised by the assembly of a jacket made of an amagnetic and non-conducting material, in the stator bore of a rotary machine.

Thanks to this assembly, the jacket cannot undergo excessive stresses any longer during the operation of the machine, caused by the differential radial dilatations of the materials used. All possible deviations are compensated for by the elastic assembly formed by the shim/elastic means combination.

In the embodiments shown in FIGS. 4 to 8, the coils are retained in the notches by fixed shims which are not dependent of the elastic assembly. Said embodiments allow the obviate to the possible dilatations of the coils.

I claim:

1. A rotary machine comprising a stator with coils retained in notches by shims and a leakproof jacket located in the stator bore wherein the shims for retaining the coils are fixed in the notch and do not close the notch and such that a passage is formed between said retaining shims and the notch end leading into the bore and wherein the machine further comprises notch closing shims of a predetermined height positioned within said passage independent of said coils and protruding from said bore to avoid direct contact between the jacket and the bore, and elastic means provided in said passage between said retaining and notch closing shims for retaining the coils and said notch closing shims, said notch closing shims exerting a pressure on the jacket and in cooperation with said elastic means providing an elastic support for the jacket, in order to compensate for any possible dilatation deviations.

2. The rotary machine according to claim 1, wherein a residual clearance defined between the jacket and the stator bore, is selected in such a way that the jacket does not come in contact with the bore, in all the working stages of the machine.

3. The rotary machine according to claim 1, wherein the notch closing shims are moveable into the notch according to the axis thereof, their movement towards the notch inner part being limited by a stop.

4. The rotary machine according to claim 1, wherein said elastic means are distributed essentially uniformly over the height of the notch closing shims.

5. The rotary machine according to claim 1, and further comprising intermediary shims, the elastic means of each notch being provided between an intermediary shim and a notch closing shim, said intermediary shim abutting against the shim for retaining the coils.

6. The rotary machine according to claim 1, wherein said elastic means are made of ripple springs.

7. The rotary machine according to claim 1, wherein said elastic means are made of springs.

8. The rotary machine according to claim 1, wherein the jacket is made of an amagnetic and non-conducting material, such as a composite or ceramic material.

* * * * *